United States Patent
Zhang et al.

(10) Patent No.: US 12,520,207 B2
(45) Date of Patent: Jan. 6, 2026

(54) FAST RETRANSMISSION DURING HANDOVER

(71) Applicant: QUALCOMM INCORPORATED, San Diego, CA (US)

(72) Inventors: Nan Zhang, Beijing (CN); Peng Wu, Shanghai (CN); Yuyi Li, Shanghai (CN); Yong Hou, Beijing (CN); Mengling Guan, Beijing (CN); Yan Zhang, Beijing (CN); Yujie Qiu, Shanghai (CN); Jun Ma, Beijing (CN); Yueming Teng, Beijing (CN); Shailesh Maheshwari, San Diego, CA (US); Gang Andy Xiao, San Diego, CA (US); Vishal Dalmiya, San Diego, CA (US); Xiaochen Chen, Beijing (CN); Vaishakh Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 18/254,352

(22) PCT Filed: Jan. 29, 2021

(86) PCT No.: PCT/CN2021/074390
§ 371 (c)(1),
(2) Date: May 24, 2023

(87) PCT Pub. No.: WO2022/160244
PCT Pub. Date: Aug. 4, 2022

(65) Prior Publication Data
US 2024/0107391 A1 Mar. 28, 2024

(51) Int. Cl.
*H04W 36/00* (2009.01)
*H04W 36/02* (2009.01)
(Continued)

(52) U.S. Cl.
CPC ....... *H04W 36/0066* (2013.01); *H04W 36/02* (2013.01); *H04W 36/249* (2023.05); *H04W 76/10* (2018.02)

(58) Field of Classification Search
CPC ............. H04W 36/0066; H04W 36/02; H04W 36/249; H04W 76/10; H04W 36/00222
See application file for complete search history.

(56) References Cited

U.S. PATENT DOCUMENTS

| | | |
|---|---|---|
| 2006/0121916 A1 | 6/2006 | Aborn et al. |
| 2014/0219241 A1 | 8/2014 | Parron |
| 2016/0360556 A1* | 12/2016 | Jeong .................... H04W 80/10 |

(Continued)

FOREIGN PATENT DOCUMENTS

| | | |
|---|---|---|
| CN | 101925116 A | 12/2010 |
| CN | 109151918 A | 1/2019 |

(Continued)

OTHER PUBLICATIONS

International Search Report and Written Opinion—PCT/CN2021/074390—ISA/EPO—Oct. 28, 2021.

(Continued)

*Primary Examiner* — Hashim S Bhatti
(74) *Attorney, Agent, or Firm* — Holland & Hart LLP

(57) ABSTRACT

Methods, systems, and devices for wireless communications are disclosed by the present application. A request to establish a call using a first connection may be received, the first connection using a first radio access technology to communicate with a radio access network. During execution of a procedure to establish the call, a command to handover communications from the first connection to a second connection that uses a second radio access technology to communicate with the radio access network may be received. The second connection may be established in response to the command, and a message indicating that the (Continued)

request to establish the call was successfully received may be transmitted over the second connection. Also, a message indicating that an alert of the call is being issued may be transmitted over the second connection.

30 Claims, 8 Drawing Sheets

(51) Int. Cl.
*H04W 36/24* (2009.01)
*H04W 76/10* (2018.01)

(56) References Cited

U.S. PATENT DOCUMENTS

| | | | | |
|---|---|---|---|---|
| 2018/0063764 | A1* | 3/2018 | Bollapalli | H04L 65/1069 |
| 2022/0182872 | A1* | 6/2022 | John | H04W 28/0284 |
| 2022/0217184 | A1* | 7/2022 | Lee | H04L 65/1066 |

FOREIGN PATENT DOCUMENTS

| | | |
|---|---|---|
| CN | 110831095 A | 2/2020 |
| CN | 111356153 A | 6/2020 |
| CN | 111757543 A | 10/2020 |
| EP | 2957125 B1 | 12/2019 |

OTHER PUBLICATIONS

Alcatel-Lucent: "Data Handling in the UE During Inter-RAT Mobility", 3GPP TSG-RAN WG2#63bis, R2-085371-300-INTER-RAT-HO, 3rd Generation Partnership Project, Mobile Competence Centre, 650, Route Des Lucioles, F-06921 Sophia-Antipolis Cedex, France, No. Prague, Czech Republic, Sep. 23, 2008, Sep. 23, 2008, 2 Pages, XP050320226, p. 2.

Supplementary European Search Report—EP21921849—Search Authority—Munich—Sep. 20, 2024.

* cited by examiner

FAST RETRANSMISSION DURING HANDOVER

CROSS REFERENCE

The present application is a 371 national stage filing of International PCT Application No. PCT/CN2021/074390 by ZHANG et al. entitled "FAST RETRANSMISSION DURING HANDOVER," filed Jan. 29, 2021, which is assigned to the assignee hereof, and which is expressly incorporated by reference in its entirety herein.

FIELD OF TECHNOLOGY

The present disclosure relates to wireless communications, including fast retransmission during handover.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may establish a call with another UE using an Internet Protocol Multimedia Subsystem (IMS), where the call may be referred to as an IMS call. A procedure for establishing an IMS call may include exchanging a set of messages including an Invite message, a 200 OK message, a 180 Ringing message, and the like.

SUMMARY

The described techniques relate to improved methods, systems, devices, and apparatuses that support fast retransmission during handover. A request to establish a call using a first connection may be received, the first connection using a first radio access technology to communicate with a radio access network. During execution of a procedure to establish the call, a command to handover communications from the first connection to a (e.g., not yet established) second connection that uses a second radio access technology to communicate with the radio access network may be received. The second connection may be established in response to the command, and a message indicating that the request to establish the call was successfully received may be transmitted over the second connection. Also, a message indicating that an alert of the call is being issued may be transmitted over the second connection.

A method for wireless communication at a user equipment (UE) is described. The method may include receiving, over a first connection with a radio access network, a request to establish a call using the first connection, the first connection using a first radio access technology, receiving, over the first connection as part of a procedure to establish the call, a command to handover communications from the first connection to a second connection with the radio access network, the second connection using a second radio access technology, establishing the second connection with the radio access network at least in part in response to receiving the command, transmitting, using the second connection after establishing the second connection, a first message indicating that the request was successfully received by the UE, and transmitting, using the second connection after transmitting the first message, a second message indicating that an alert of the call is being issued at the UE.

An apparatus for wireless communication at a UE is described. The apparatus may include a processor, memory coupled with the processor, and instructions stored in the memory. The instructions may be executable by the processor to cause the apparatus to receive, over a first connection with a radio access network, a request to establish a call using the first connection, the first connection using a first radio access technology, receive, over the first connection as part of a procedure to establish the call, a command to handover communications from the first connection to a second connection with the radio access network, the second connection using a second radio access technology, establish the second connection with the radio access network at least in part in response to receiving the command, transmit, using the second connection after establishing the second connection, a first message indicating that the request was successfully received by the UE, and transmit, using the second connection after transmitting the first message, a second message indicating that an alert of the call is being issued at the UE.

Another apparatus for wireless communication at a UE is described. The apparatus may include means for receiving, over a first connection with a radio access network, a request to establish a call using the first connection, the first connection using a first radio access technology, means for receiving, over the first connection as part of a procedure to establish the call, a command to handover communications from the first connection to a second connection with the radio access network, the second connection using a second radio access technology, means for establishing the second connection with the radio access network at least in part in response to receiving the command, means for transmitting, using the second connection after establishing the second connection, a first message indicating that the request was successfully received by the UE, and means for transmitting, using the second connection after transmitting the first message, a second message indicating that an alert of the call is being issued at the UE.

A non-transitory computer-readable medium storing code for wireless communication at a UE is described. The code may include instructions executable by a processor to receive, over a first connection with a radio access network, a request to establish a call using the first connection, the first connection using a first radio access technology, receive, over the first connection as part of a procedure to establish the call, a command to handover communications from the first connection to a second connection with the radio access network, the second connection using a second radio access technology, establish the second connection with the radio access network at least in part in response to receiving the command, transmit, using the second connection after establishing the second connection, a first message indicating that the request was successfully received by the UE, and transmit, using the second connection after transmitting the first message, a second message indicating that an alert of the call is being issued at the UE.

Some examples of the method, apparatuses, and non-transitory computer-readable medium described herein may further include operations, features, means, or instructions for transmitting the first message using the first connection prior to transmitting the first message using the second connection, where the first message may be transmitted using the second connection based on the first message being unacknowledged by the radio access network.

Some examples of the method, apparatuses, and non-transitory computer-readable medium described herein may further include operations, features, means, or instructions for starting a timer associated with discarding the first message based on transmitting the first message using the first connection and disabling the timer based on receiving the command.

Some examples of the method, apparatuses, and non-transitory computer-readable medium described herein may further include operations, features, means, or instructions for buffering the first message based on receiving the command.

Some examples of the method, apparatuses, and non-transitory computer-readable medium described herein may further include operations, features, means, or instructions for buffering a set of multiple messages associated with communicating with the radio access network via the first connection based on receiving the command, the set of multiple messages including the first message.

Some examples of the method, apparatuses, and non-transitory computer-readable medium described herein may further include operations, features, means, or instructions for identifying a third message associated with communicating with the radio access network via the first connection as having a priority that exceeds a threshold and determining that the third message was discarded before an acknowledgement was received from the radio access network for the third message, where buffering the set of multiple messages includes buffering the third message based on determining that the third message was discarded.

Some examples of the method, apparatuses, and non-transitory computer-readable medium described herein may further include operations, features, means, or instructions for transmitting the third message using the second connection based on buffering the third message.

Some examples of the method, apparatuses, and non-transitory computer-readable medium described herein may further include operations, features, means, or instructions for identifying, after establishing the second connection, a third message associated with communicating with the radio access network via the second connection as having a priority that exceeds a threshold, determining that the third message was discarded before an acknowledgement was received from the radio access network for the third message, buffering the third message based on the message being discarded, and retransmitting the third message before transmitting other messages in a radio link control buffer.

In some examples of the method, apparatuses, and non-transitory computer-readable medium described herein, establishing the second connection may include operations, features, means, or instructions for establishing a radio bearer for the second radio access technology.

In some examples of the method, apparatuses, and non-transitory computer-readable medium described herein, the request may be an INVITE message, the command may be a mobilityfromNRCommand, the first message may be a 200 OK message, and the second message may be a 180 Ringing message.

DETAILED DESCRIPTION

Figure 1:
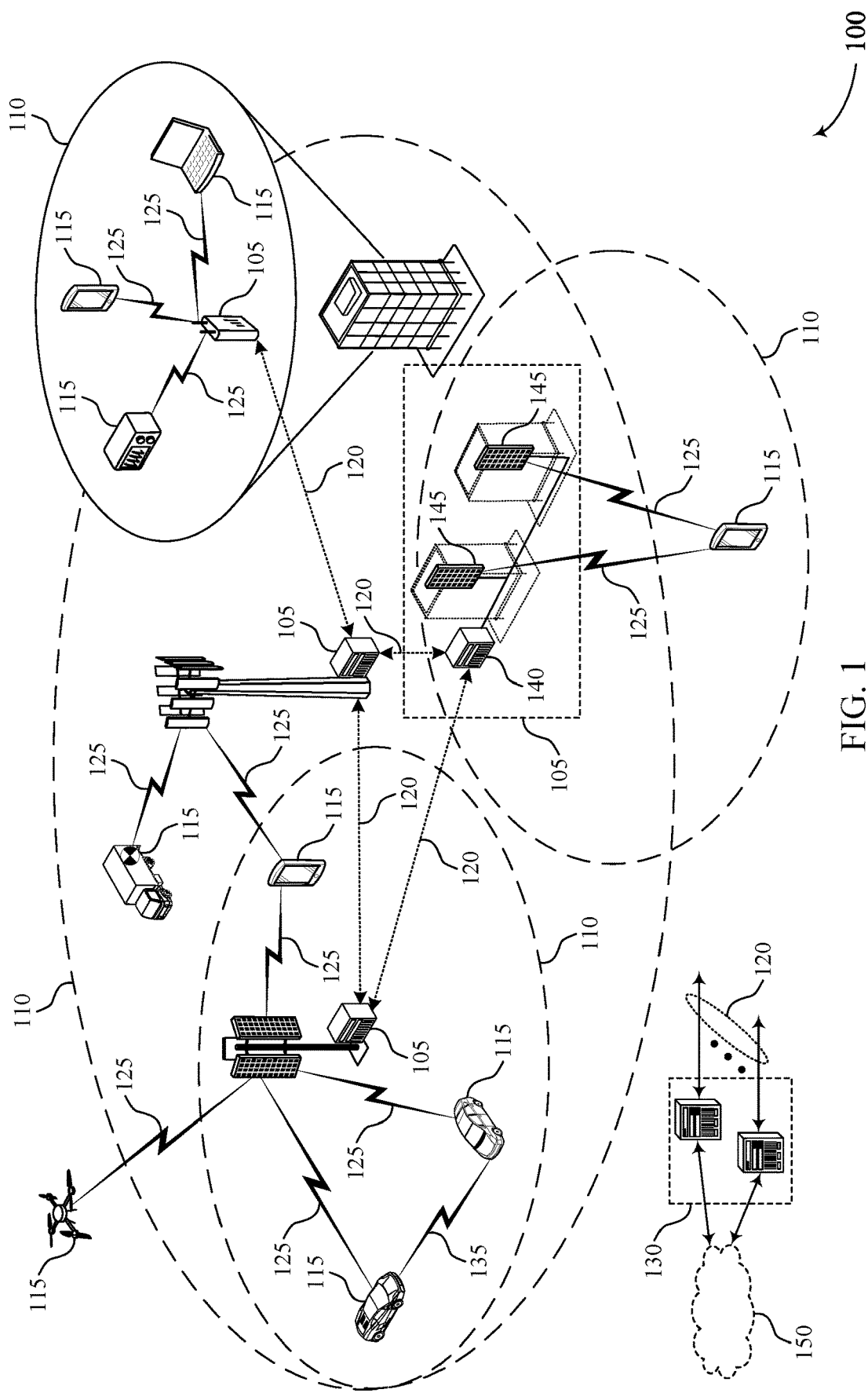
FIG. 1 illustrates an example of a wireless communications system that supports fast retransmission during handover in accordance with aspects of the present disclosure.

Higher-layer signaling (e.g., radio link control (RLC) signaling) may be used to support communications between devices in a wireless communications system. In some examples, an acknowledged mode is configured for higher-layer signaling. While the acknowledged mode is enabled, a device may store an RLC message (e.g., an RLC protocol data unit (PDU)) until an acknowledgment that the RLC message was received by another device is received or a timer associated with the RLC message expires.

In some examples, devices in a wireless communications system may communicate with other wireless devices in the wireless communications system using a first radio access technology, a second radio access technology, or both. In some examples, while communicating with a radio access network over a first connection associated with a first radio access technology, a device may receive a command to handover communications (also referenceable as a "handover command") to a second connection associated with a second radio access technology. In some examples, the handover command is received while a procedure for establishing a call (e.g., an Internet Protocol Media Subsystem (IMS) call) is being performed. In some examples, RLC PDUs associated with the first connection (e.g., unacknowledged RLC PDUs, not yet transmitted RLC PDUs, RLC PDUs associated with establishing the call, etc.) may be discarded as part of the handover procedure.

However, discarding RLC PDUs associated with the first connection as part of switching to the second connection may cause the procedure for establishing the IMS call to fail. For example, for an IMS calling procedure, if a transmission of an RLC PDU used to support establishing the IMS call (e.g., an RLC PDU associated with a session initiation protocol (SIP) UPDATE 200 OK message) fails, the RLC PDU may be discarded as part of the switch to the second connection. Thus, the RLC PDU may not be delivered to the radio access network. In some examples, after switching to the second connection and as the IMS procedure continues, additional RLC PDUs that support establishing the IMS call may be transmitted to the network, resulting in the successful, but out-of-order, delivery of other messages that support establishing the IMS call (e.g., a SIP 180 RING message). The out-of-order delivery of these messages may cause an abnormal IMS call (e.g., a one-way call) to be established.

To support the successful and seamless execution of communication procedures while switching between connections that use different radio access technologies, queued and unacknowledged RLC PDUs associated with a first connection of a first radio access technology may be buffered and then transmitted using a second connection associated with a second radio access technology as part of the switch (e.g., after at least a portion of the switch is complete) or after the switch is completed. In some examples, a device receives, over a first connection with a radio access network, an invitation to establish a call using the first connection, where the first connection is associated with a first radio access technology (e.g., a new radio (NR) technology). In some examples, the device may generate one or more RLC messages for transmission over the first connection, including an RLC message for indicating the invention was successfully processed, based on receiving the invitation.

During execution of a procedure for establishing the call, the device may receive a command (also referred to as a "handover command") to handover communications from the first connection to a (e.g., not yet established) second connection with the radio access network that is associated with a second radio access technology. The device may establish the second connection with the radio access network based on receiving the handover command—e.g., by establishing a radio bearer associated with the second radio access technology. After establishing the second connection, the device may generate one or more RLC messages for transmission over the second connection, including an RLC message for indicating that an alert of the call is being issued. Also, after establishing the second connection, the device may transmit, over the second connection, one or more RLC messages generated for the first connection before transmitting an RLC message associated with the second connection.

By transmitting the one or more RLC messages generated for the first connection before transmitting the RLC message associated with the second connection, a device may ensure that RLC message associated with establishing a call are transmitted in an order expected by the IMS entity, avoiding call failures that may otherwise occur. Also, the device may ensure that important RLC messages (e.g., RLC messages having a priority level exceeding a threshold) transmitted over the first connection that affect communications over the second connection are transmitted to the radio access network after handover.

Aspects of the disclosure are initially described in the context of wireless communications systems. Aspects of the disclosure are also described in the context of a process flow. Aspects of the disclosure are further illustrated by and described with reference to apparatus diagrams, system diagrams, and flowcharts that relate to fast retransmission during handover.

FIG. 1 illustrates an example of a wireless communications system 100 that supports fast retransmission during handover in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of several determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into several slots. Alternatively, each frame may include a variable number of slots, and the number of slots may depend on subcarrier spacing. Each slot may include several symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by several symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to several control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be in diverse geographic locations. A base station 105 may have an antenna array with several rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

RLC signaling may be used to exchange higher-layer information between a UE 115 and a base station 105. In some examples, a UE 115 may enable an acknowledged mode (AM) for communicating radio link control signaling. While in the AM, the UE 115 may transmit the higher-layer information using AM RLC protocol data units (PDUs). After transmitting an AM RLC PDU, the AM RLC PDU may be included in an RLC transmission window until an acknowledgement message is received from a base station 105, at which point the AM RLC PDU may be removed from the RLC transmission window. In some examples, if an acknowledgement message is not received for the AM RLC PDU within a duration of transmitting the AM RLC PDU, the UE 115 may retransmit the AM RLC PDU to the base station 105.

Devices (e.g., UEs 115 and base stations 105) in a wireless communications system 100 may communicate with one another using different communication protocols and technologies. For example, some devices may communicate with one another using a first radio access technology (e.g., LTE), while other devices may communicate with one another using a second radio access technology (e.g., NR). In some examples, a base station 105 may communicate with a first set of UEs 115 using the first radio access technology and a second set of UEs 115 using the second radio access technology. In some examples, a UE 115 may communicate with a first set of base stations 105 using the first radio access technology and a second set of base stations 105 using the second radio access technology. In some examples, devices may concurrently use the first radio access technology and the second radio access technology to communicate with one another.

In some examples, a UE 115 may establish a connection with a radio access network using a first radio access technology (e.g., NR), and may be referred to as being in a standalone mode (e.g., an NR SA mode). While in the standalone mode, the UE 115 may initiate a communications procedure with the radio access network using the first connection. In some examples, while the communications procedure is being executed, the radio access network may reconfigure the UE 115 to establish a connection with the radio access network using a second radio access technology (e.g., LTE) instead of the first radio access technology—e.g., by triggering a packet-switched handover procedure from the first radio access technology to the second radio access technology. In some examples, when the UE 115 switches from the connection associated with the first radio access network to the connection associated with the second radio access network, the UE 115 discards the pending RLC packets (e.g., RLC PDUs that are buffered for transmission and RLC PDUs that have been transmitted but not yet acknowledged). In some examples, the UE 115 includes two different RLC entities, one associated with the first radio access technology and another associated with the second radio access technology.

As for other communications procedures, radio link control signaling may be used to establish an IMS call for a UE 115. When an AM is enabled, a UE 115 may transmit radio link control signaling that supports IMS calling using AM RLC PDUs (e.g., a SIP 183 message, a SIP UPDATE 200 OK message, and a SIP 180 RING message). Also, the UE 115 may retransmit IMS messages that are not acknowledged by a base station 105 to ensure that an IMS call is properly established. Also, as for other communications procedures, a UE 115 may be instructed to switch from a first connection associated with a first radio access technology to a second connection associated with a second radio access technology while executing a communications procedure for establishing an IMS call over the radio access network. In such cases, the UE 115 may continue executing the communications procedure for establishing an IMS call to establish a voice-over LTE call (which may be referred to as an evolved packet system (EPS) fallback call) using the second connection. Additionally, as part of switching to the second connection, the UE 115 may discard RLC PDUs (including AM RLC PDUs) associated with the first connection.

However, discarding RLC PDUs associated with the first connection as part of switching to the second connection may cause the procedure for establishing the IMS call to fail. For example, for an IMS calling procedure, if a transmission of an RLC PDU used to support establishing the IMS call (e.g., an RLC PDU associated with a SIP UPDATE 200 OK message) fails, the RLC PDU may be discarded as part of the switch to the second connection, and thus, the RLC PDU may not be delivered to the radio access network. In some examples, after switching to the second connection and as the IMS procedure continues, additional RLC PDUs that support establishing the IMS call may be transmitted to the network, resulting in the successful, but out-of-order, delivery of other messages that support establishing the IMS call (e.g., a SIP 180 RING message). The out-of-order delivery of these messages may cause an abnormal IMS call (e.g., a one-way call) to be established.

To support the successful and seamless execution of communication procedures while switching between connections that use different radio access technologies, queued and unacknowledged RLC PDUs associated with a first connection of a first radio access technology may be buffered and then transmitted using a second connection associated with a second radio access technology after the switch is completed. In some examples, a device receives, over a first connection with a radio access network, an invitation to establish a call using the first connection, where the first connection is associated with a first radio access technology (e.g., a new radio (NR) technology). In some examples, the device may generate one or more RLC messages for transmission over the first connection, including an RLC message for indicating the invitation was successfully processed, based on receiving the invitation.

While executing a procedure for establishing the call, the device may receive a command (also referred to as a "handover command") to handover communications from the first connection to a second connection with the radio access network that is associated with a second radio access technology. The device may establish the second connection with the radio access network based on receiving the handover command—e.g., by establishing a radio bearer associated with the second radio access technology. After establishing the second connection, the device may generate one or more RLC messages for transmission over the second connection, including an RLC message for indicating that an alert of the call is being issued. Also, after establishing the second connection, the device may transmit, over the second connection, one or more RLC messages generated for the first connection before transmitting an RLC message associated with the second connection.

By transmitting the one or more RLC messages generated for the first connection before transmitting the RLC message associated with the second connection, a device may ensure that RLC message associated with establishing a call are transmitted in an expected order, avoiding call failures that may otherwise occur. Also, the device may ensure that RLC messages having priority levels that exceed a threshold transmitted over the first connection that affect communications over the second connection are transmitted to the radio access network after handover.

Figure 2:
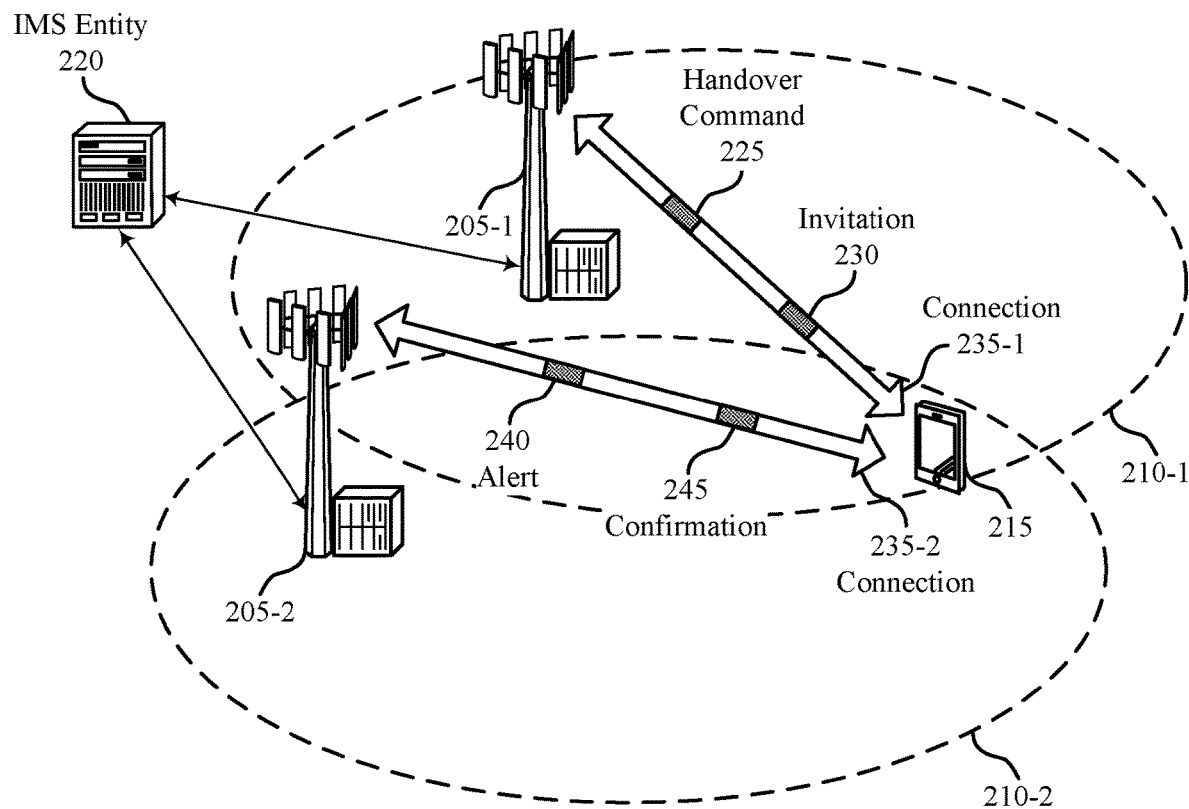
FIG. 2 illustrates an example of a wireless communications subsystem that supports fast retransmission during handover in accordance with aspects of the present disclosure.

FIG. 2 illustrates an example of a wireless communications subsystem that supports fast retransmission during handover in accordance with aspects of the present disclosure.

Wireless communications subsystem 200 may include first base station 205-1, second base station 205-2, and UE 215, which may be examples of a base station or UE described herein. UE 215 may communicate with first base station 205-1 and second base station 205-2 using one or more of the techniques described in FIG. 1.

First base station 205-1 may be used to support communications using a first radio access technology (e.g., NR) and second base station 205-2 may be used to support communications using a second radio access technology (e.g., LTE). In some examples, first base station 205-1 may be separated from (or co-located with) second base station 205-2. Also, first base station 205-1 and second base station 205-2 may both be coupled with IMS entity 220. IMS entity 220 may be configured to provide voice services (e.g., calling) over established radio bearers—e.g., without using a circuit-switched network.

In some examples, first base station 205-1 establishes first connection 235-1 with UE 215. First connection 235-1 may be established in accordance with a communication protocol associated with a first radio access technology (e.g., NR). After establishing first connection 235-1, first base station 205-1 and UE 215 may exchange information, including RLC messages. In some examples, RLC messages for establishing a voice call are communicated between IMS entity 220 and UE 215 via first base station 205-1 and first connection 235-1—e.g., over a radio bearer established as part of first connection 235-1.

For example, UE 215 may receive an invitation message 230 to establish a call (e.g., an IMS call) from IMS entity 220 via first base station 205-1 and first connection 235-1.

Invitation message 230 may be a SIP Invite message. Accordingly, UE 215 may begin executing a procedure for establishing the call. The procedure may include generating and transmitting messages to IMS entity 220 via first base station 205-1 and first connection 235-1. For example, UE 215 may transmit information for establishing the call to IMS entity 220 via first base station 205-1 (e.g., in a SIP 183 message), and IMS entity 220 205 may respond with additional information (e.g., in a SIP Update message) via first base station 205-1. After receiving the additional information, UE 215 may generate a message (e.g., a SIP 200 OK message) confirming that the additional information has been successfully processed.

In some examples, before UE 215 transmits the confirmation message to first base station 205-1, UE 215 may receive handover command 225 from first base station 205-1. In some examples, UE 215 receives handover command 225 after transmitting the confirmation message but before an acknowledgement of the confirmation message is received from IMS entity 220 via first base station 205-1. Handover command 225 may direct UE 215 to terminate first connection 235-1, establish second connection 235-2, and to continue communicating (e.g., to continue a procedure for establishing an IMS call) with the radio access network (e.g., with IMS entity 220) over second connection 235-2. In some examples, handover command 225 is a mobilityfromNRCommand.

Based on receiving handover command 225, UE 215 may buffer RLC messages (including IMS-based RLC messages and RLC messages that have been identified as having a high priority level). In some examples, UE 215 may buffer the confirmation message based on not yet transmitting the confirmation message or based on not yet receiving an acknowledgment message for the confirmation message. Concurrently with buffering the RLC messages, UE 215 may establish second connection 235-2 with second base station 205-2. Establishing second connection 235-2 may include establishing one or more radio bearers between UE 215 and second base station 205-2 in accordance with a second radio access technology. After establishing the one or more radio bearers, UE 215 may begin exchanging information with second base station 205-2. In some examples, after establishing the one or more radio bearers, UE 215 generates message (e.g., a SIP 180 Ringing message) for continuing the procedure for establishing the IMS call for transmission over second connection 235-2.

In some examples, immediately (or soon, for example within a threshold time duration) after establishing the one or more radio bearers, UE 215 may transmit the buffered RLC messages (e.g., including the confirmation message) to second base station 205-2. In some examples, UE 215 transmits the buffered RLC messages generated while first connection 235-1 was established before transmitting RLC messages generated after second connection 235-2 is established—e.g., before transmitting the SIP 180 Ringing message. In some examples, UE 215 may transmit the buffered confirmation message to second base station 205-2 as confirmation message 245.

After transmitting confirmation message 245 (and, in some examples, after receiving an acknowledgment for confirmation message 245), UE 215 may transmit alert message 240 to second base station 205-2. Alert message 240 may indicate to IMS entity 220 that UE 215 is issuing an alert of the IMS call to a user of UE 215—e.g., by ringing, vibrating, displaying, blinking, etc. In some examples, alert message 240 may correspond to the message for continuing the procedure previously generated by UE 215 (for example, the message may correspond to the SIP 180 Ringing message).

By buffering the confirmation generated for transmission over first connection 235-1, and subsequently, transmitting confirmation message 245 before transmitting alert message 240, UE 215 may ensure that the IMS messaging is received at IMS entity 220 in the proper order. In some cases, if the IMS message is received at IMS entity 220 out-of-order, an abnormal IMS call (e.g., a one-way call) may be established for UE 215.

Figure 3:
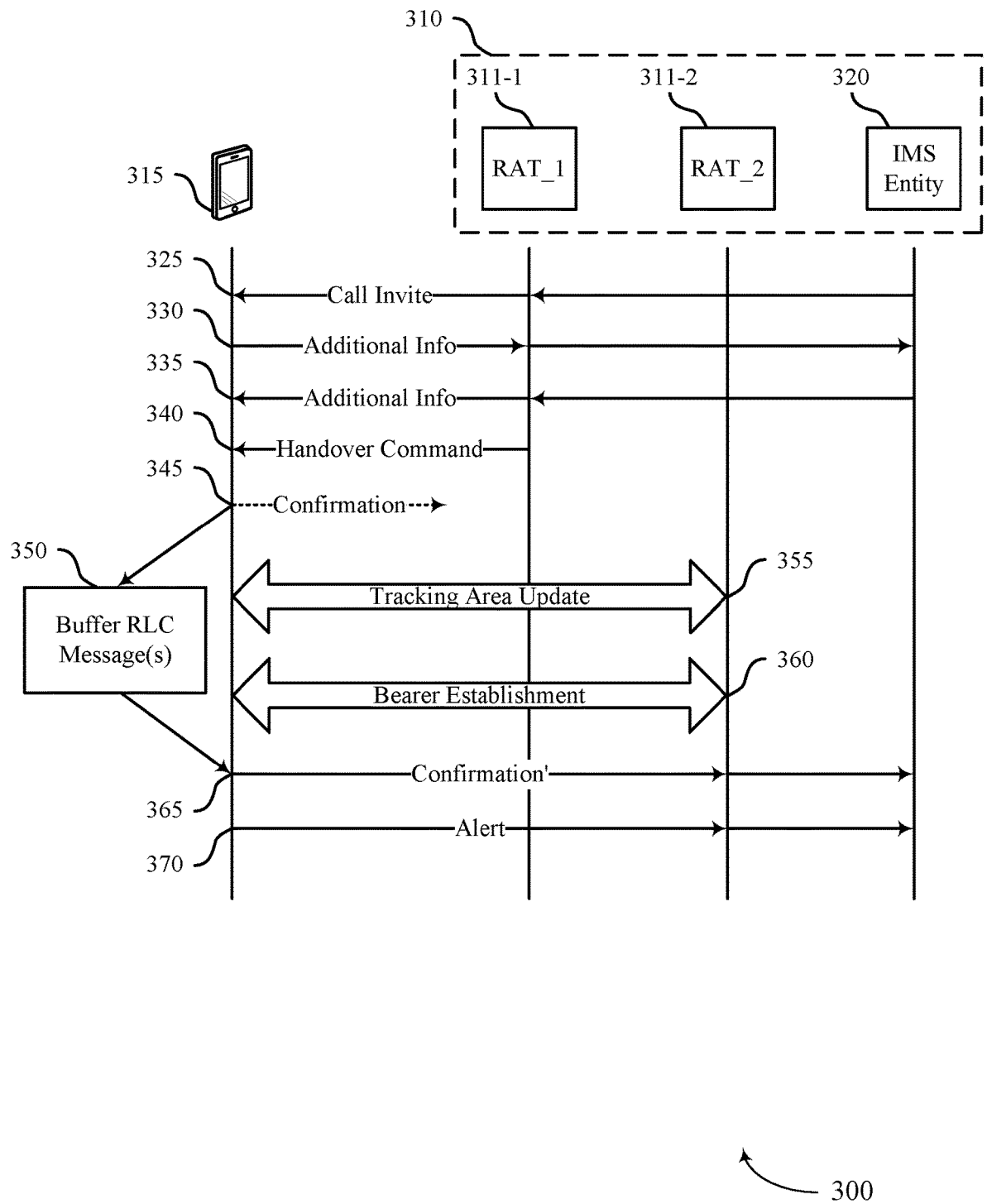
FIG. 3 illustrates an example of a process flow that supports fast retransmission during handover in accordance with aspects of the present disclosure.

FIG. 3 illustrates an example of a process flow that supports fast retransmission during handover in accordance with aspects of the present disclosure.

Process flow 300 may be performed between UE 315 and radio access network 310. UE 315 may be an example of a UE described herein. Radio access network 310 may be an example of a portion of a wireless communications system used to provide communication services to UEs as described herein. Radio access network 310 may include base stations, a core network, routing equipment, and the like. In some examples, radio access network 310 includes first radio subsystem 311-1, second radio subsystem 311-2, and IMS entity 320.

First radio subsystem 311-1 may include components (e.g., base stations, backhaul interfaces, management entities, etc.) that support communications using a first radio access technology (e.g., NR). Second radio subsystem 311-2 may include components (e.g., base stations, backhaul interfaces, management entities, etc.) that support communications using a second radio access technology (e.g., LTE). Both first radio subsystem 311-1 and second radio subsystem 311-2 may be communicatively coupled with IMS entity 320.

In some examples, process flow 300 illustrates an exemplary sequence of operations performed to support control information buffering during cell change. For example, process flow 300 depicts operations for buffering RLC messages after receiving a handover command and transmitting (or retransmitting) the buffered RLC messages after completing a cell change. It is understood that one or more of the operations described in process flow 300 may be performed earlier or later in the process, omitted, replaced, supplemented, or performed in combination with another operation. Also, additional operations described herein that are not included in process flow 300 may be included.

At 325, UE 315 may receive an invitation to establish an IMS call from IMS entity 320 via first radio subsystem 311-1. In some examples, the invitation is a SIP Invite message.

At 330, UE 315 may send additional information for establishing the IMS call to IMS entity 320 via first radio subsystem 311-1. In some examples, the additional information is included in a SIP 183 Session Progress message.

At 335, UE 315 may receive additional information for establishing the IMS call from IMS entity 320 via first radio subsystem 311-1. In some examples, the additional information is included in a SIP Update message. In some examples, after receiving the SIP Update message, UE 315 may generate a message (also referenceable as a "confirmation message") confirming that the additional information was received at UE 315.

At 340, UE 315 may receive a handover command from first radio subsystem 311-1 directing UE 315 to break the connection between UE 315 and first radio subsystem 311-1 and to establish a connection between UE 315 and second radio subsystem 311-2. In some examples, the handover command is a mobilityfromNRCommand.

At 345, UE 315 may transmit the generated confirmation message to IMS entity 320 via first radio subsystem 311-1. In some examples, after transmitting the generated confirmation message to IMS entity 320, the connection between UE 315 and first radio subsystem 311-1 may be broken. In some cases, the confirmation message may be successfully delivered to IMS entity 320, however, UE 315 may not receive an acknowledgement from IMS entity 320 indicating that the confirmation message was successfully delivered. In other cases, the confirmation message may not be successfully delivered to IMS entity 320. After the confirmation message is transmitted, one or more RLC PDUs used to transmit the confirmation message may be stored in an RLC transmission window. In some examples, UE 315 may refrain from transmitting the confirmation message based on receiving the handover command.

At 350, UE 315 may buffer one or more RLC PDUs based on receiving the handover command—e.g., in an internal storage buffer of UE 315. In some examples, the buffer may be a region of shared or dedicated physical or virtual memory of the UE 315 (e.g., memory as further described herein, such as memory 730) accessible to a processor (e.g., one or more processors as further described herein, such as processor 740) of the UE 315. In some examples, UE 315 buffers RLC messages associated with establishing an IMS call (e.g., a confirmation message). In some examples, UE 315 also buffers RLC messages that have been identified as having a high priority. In some examples, UE 315 determines an RLC PDU has a high priority based on determining that a quality of service (QoS) associated with the RLC PDU exceeds a threshold. In some examples, UE 315 buffers RLC messages that have been transmitted and are in an RLC transmission window. In some examples, UE 315 may also buffer RLC message that have not yet been transmitted. After buffering the RLC PDUs, UE 315 may clear the RLC transmission buffer and window of RLC PDUs for communicating with first radio subsystem 311-1.

At 355, UE 315 may perform a tracking area update procedure to establish a connection with second radio subsystem 311-2.

At 360, UE 315 may establish one or more radio bearer over the connection to second radio subsystem 311-2. UE 315 and second radio subsystem 311-2 may communicate information over the one or more radio bearers.

At 365, UE 315 may transmit the RLC PDUs stored in the internal storage buffer over the connection to second radio subsystem 311-2. In some examples, UE 315 may transmit the buffered confirmation message to IMS entity 320 via second radio subsystem 311-2.

At 370, UE 315 may transmit an alert message to IMS entity 320 via second radio subsystem 311-2. The alert message may indicate that UE 315 is alerting a user of UE 315 of the IMS call (e.g., by ringing, vibrating, flashing, etc.). In some examples, the alert message is a SIP 180 Ringing message.

Thus, by buffering and transmitting (and, in some examples, retransmitting) the confirmation message after establishing the one or more radio bearers, UE 315 may ensure that IMS entity 320 receives the confirmation message before the alert message—e.g., if the confirmation message transmitted at 345 fails. As described herein, an abnormal call (e.g., a one-way call) may be established if IMS entity 320 receives the alert message before the confirmation message. In such cases, UE 315 may transmit the alert message after the one or more bearers are established with second radio subsystem 311-2, and IMS entity may retransmit the additional information (e.g., in a retransmitted SIP Update message) to UE 315 after receiving the alert message via second radio subsystem 311-2. In response, UE 315 may retransmit the confirmation message (e.g., in a retransmitted SIP 200 OK message) to IMS entity 320, and IMS entity 320 may establish the abnormal call. In some examples, the retransmitted confirmation message may be associated with a local quality of service of zero, and IMS entity 320 establishes the one-way call after determining that the call is in an unsatisfied state based on the retransmitted confirmation message having a quality of service of zero.

In some examples, the handover command may be received earlier or later in the procedure for establishing the IMS call. In such cases, UE 315 may similarly buffer IMS-based RLC PDUs and important RLC PDUs after the handover command is received and retransmit the buffered RLC PDUs after the connection to second radio subsystem 311-2 is established. Although generally described in the context of an IMS calling procedure, UE 315 may similarly buffer RLC PDUs associated with other procedures to ensure that the RLC PDUs for the other procedures are received in order at corresponding entities.

In some examples, a similar procedure is performed to buffer and retransmit RLC PDUs that are discarded within a same connection. For example, after establishing the second connection, UE 315 may transmit an RLC PDU to second radio subsystem 311-2, where the RLC PDU may have a priority that exceeds a threshold (e.g., a confirmation message). After failing to receive an acknowledgment for the RLC PDU, the RLC PDU may be removed from an RLC window. Based on the RLC PDU having a priority that exceeds the threshold, UE 315 may store the RLC PDU in an internal buffer. Also, UE 315 may retransmit the RLC PDUs in the internal buffer (including the stored RLC PDU) before transmitting other RLC PDUs in an RLC buffer. In some examples, UE 315 may transmit the RLC PDU stored in the internal buffer before a related RLC PDU stored in the RLC buffer—e.g., if the transmission order of the RLC PDUs affects an associated procedure, for example part of the successful establishment of an IMS call. For example, UE 315 may transmit a confirmation message stored in the internal buffer before an alert message stored in the RLC buffer to avoid the establishment of an abnormal IMS call.

Figure 4:
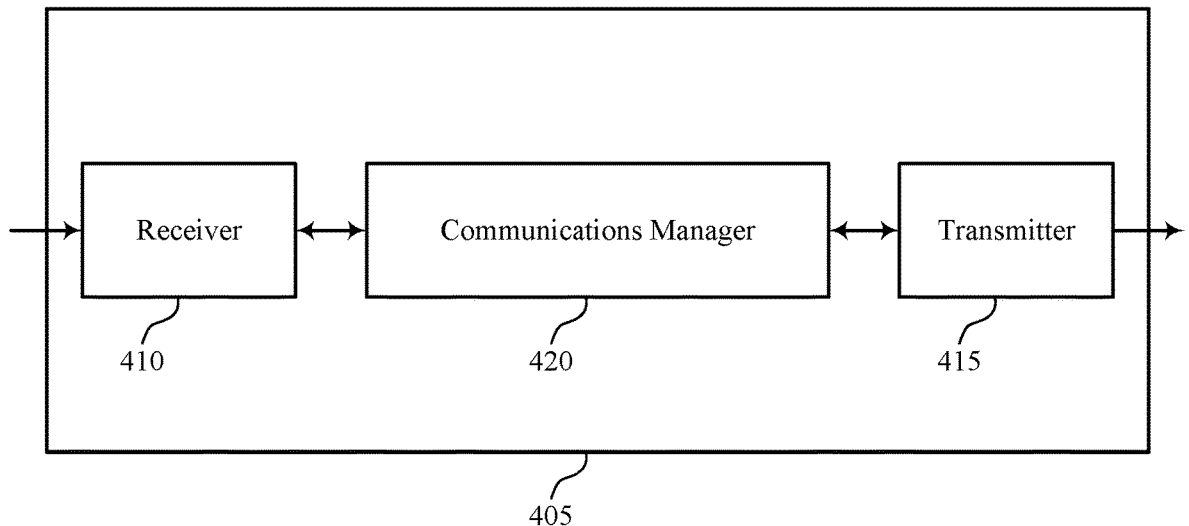
FIGS. 4 and 5 show block diagrams of devices that support fast retransmission during handover in accordance with aspects of the present disclosure.

FIG. 4 shows a block diagram 400 of a device 405 that supports fast retransmission during handover in accordance with aspects of the present disclosure. The device 405 may be an example of aspects of a UE 115 as described herein. The device 405 may include a receiver 410, a transmitter 415, and a communications manager 420. The device 405 may also include one or more processors, memory coupled with the one or more processors, and instructions stored in the memory that are executable by the one or more processors to enable the one or more processors to perform the fast retransmission features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to fast retransmission during handover). Information may be passed on to other components of the device 405. The receiver 410 may utilize a single antenna or a set of multiple antennas.

The transmitter 415 may provide a means for transmitting signals generated by other components of the device 405.

For example, the transmitter 415 may transmit information such as packets, user data, control information, or any combination thereof associated with various information channels (e.g., control channels, data channels, information channels related to fast retransmission during handover). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of fast retransmission during handover as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, over a first connection with a radio access network, a request to establish a call using the first connection, the first connection using a first radio access technology. The communications manager 420 may be configured as or otherwise support a means for receiving, over the first connection as part of a procedure to establish the call, a command to handover communications from the first connection to a second connection with the radio access network, the second connection using a second radio access technology. The communications manager 420 may be configured as or otherwise support a means for establishing the second connection with the radio access network at least in part in response to receiving the command. The communications manager 420 may be configured as or otherwise support a means for transmitting, using the second connection after establishing the second connection, a first message indicating that the request was successfully received by the UE. The communications manager 420 may be configured as or otherwise support a means for transmitting, using the second connection after transmitting the first message, a second message indicating that an alert of the call is being issued at the UE.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for increasing a likelihood that an IMS call will be successfully established when a handover command is received during establishment of the IMS call.

Figure 5:
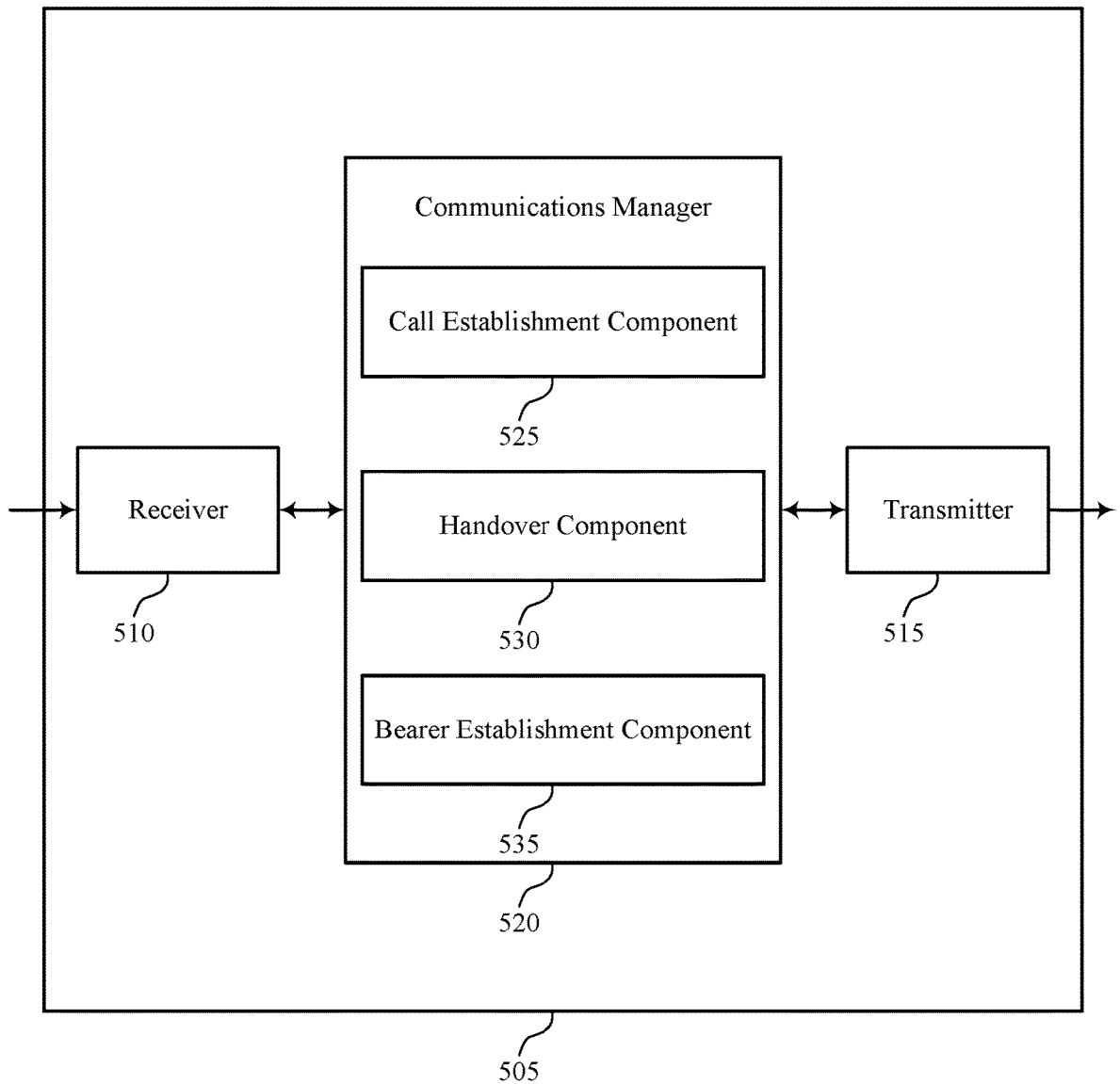

FIG. 5 shows a block diagram 500 of a device 505 that supports fast retransmission during handover in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to fast retransmission during handover). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to fast retransmission during handover). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of fast retransmission during handover as described herein. For example, the communications manager 520 may include a call establishment component 525, a handover component 530, a bearer establishment component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The call establishment component 525 may be configured as or otherwise support a means for receiving, over a first connection with a radio access network, a request to establish a call using the first connection, the first connection using a first radio access technology. The handover component 530 may be configured as or otherwise support a means for receiving, over the first connection as part of a procedure to establish the call, a command to handover communications from the first connection to a second connection with the radio access network, the second connection using a second radio access technology. The bearer establishment component 535 may be configured as or otherwise support a means for establishing the second connection with the radio access network at least in part in response to receiving the command. The call establishment component 525 may be configured as or otherwise support a means for transmitting, using the second connection after establishing the second connection, a first message indicating that the request was successfully received by the UE. The call establishment component 525 may be configured as or otherwise support a means for transmitting, using the second connection after transmitting the first message, a second message indicating that an alert of the call is being issued at the UE.

In some cases, the call establishment component 525, the handover component 530, and the bearer establishment component 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the call establishment component 525, the handover component 530, and the bearer establishment component 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
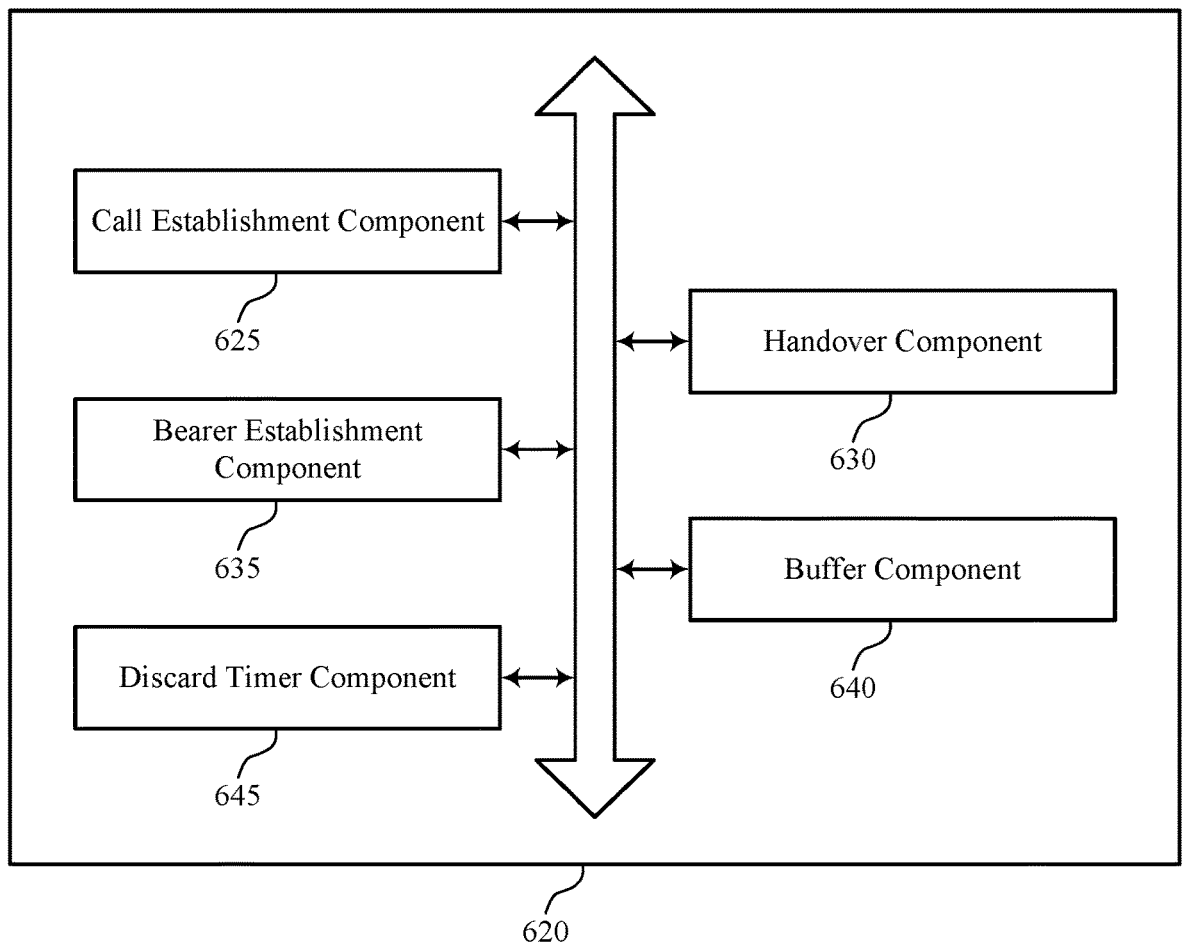
FIG. 6 shows a block diagram of a communications manager that supports fast retransmission during handover in accordance with aspects of the present disclosure.

FIG. 6 shows a block diagram 600 of a communications manager 620 that supports fast retransmission during handover in accordance with aspects of the present disclosure. The communications manager 620 may be an example of aspects of a communications manager 420, a communications manager 520, or both, as described herein. The communications manager 620, or various components thereof, may be an example of means for performing various aspects of fast retransmission during handover as described herein. For example, the communications manager 620 may include a call establishment component 625, a handover component 630, a bearer establishment component 635, a buffer component 640, a discard timer component 645, or any combination thereof. Each of these components may communicate, directly or indirectly, with one another (e.g., via one or more buses).

The communications manager 620 may support wireless communication at a UE in accordance with examples as disclosed herein. The call establishment component 625 may be configured as or otherwise support a means for receiving, over a first connection with a radio access network, a request to establish a call using the first connection, the first connection using a first radio access technology. The handover component 630 may be configured as or otherwise support a means for receiving, over the first connection as part of a procedure to establish the call, a command to handover communications from the first connection to a second connection with the radio access network, the second connection using a second radio access technology. The bearer establishment component 635 may be configured as or otherwise support a means for establishing the second connection with the radio access network at least in part in response to receiving the command. In some examples, the call establishment component 625 may be configured as or otherwise support a means for transmitting, using the second connection after establishing the second connection, a first message indicating that the request was successfully received by the UE. In some examples, the call establishment component 625 may be configured as or otherwise support a means for transmitting, using the second connection after transmitting the first message, a second message indicating that an alert of the call is being issued at the UE.

In some examples, the call establishment component 625 may be configured as or otherwise support a means for transmitting the first message using the first connection prior to transmitting the first message using the second connection, where the first message is transmitted using the second connection based on the first message being unacknowledged by the radio access network.

In some examples, the discard timer component 645 may be configured as or otherwise support a means for starting a timer associated with discarding the first message based on transmitting the first message using the first connection. In some examples, the discard timer component 645 may be configured as or otherwise support a means for disabling the timer based on receiving the command.

In some examples, the buffer component 640 may be configured as or otherwise support a means for buffering the first message based on receiving the command.

In some examples, the buffer component 640 may be configured as or otherwise support a means for buffering a set of multiple messages associated with communicating with the radio access network via the first connection based on receiving the command, the set of multiple messages including the first message.

In some examples, the buffer component 640 may be configured as or otherwise support a means for identifying a third message associated with communicating with the radio access network via the first connection as having a priority that exceeds a threshold. In some examples, the buffer component 640 may be configured as or otherwise support a means for determining that the third message was discarded before an acknowledgement was received from the radio access network for the third message, where buffering the set of multiple messages includes buffering the third message based on determining that the third message was discarded.

In some examples, the call establishment component 625 may be configured as or otherwise support a means for transmitting the third message using the second connection based on buffering the third message.

In some examples, the buffer component 640 may be configured as or otherwise support a means for identifying, after establishing the second connection, a third message associated with communicating with the radio access network via the second connection as having a priority that exceeds a threshold. In some examples, the buffer component 640 may be configured as or otherwise support a means for determining that the third message was discarded before an acknowledgement was received from the radio access network for the third message. In some examples, the buffer component 640 may be configured as or otherwise support a means for buffering the third message based on the third message being discarded. In some examples, the call establishment component 625 may be configured as or otherwise support a means for retransmitting the third message before transmitting other messages in a radio link control buffer.

In some examples, to support establishing the second connection, the bearer establishment component 635 may be configured as or otherwise support a means for establishing a radio bearer for the second radio access technology.

In some examples, the request is an INVITE message, the command is a mobilityfromNRCommand, the first message is a 200 OK message, and the second message is a 180 Ringing message.

In some cases, the call establishment component 625, the handover component 630, the bearer establishment component 635, the buffer component 640, the discard timer component 645 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the call establishment component 625, the handover component 630, the bearer establishment component 635, the buffer component 640, the discard timer component 645 discussed herein.

Figure 7:
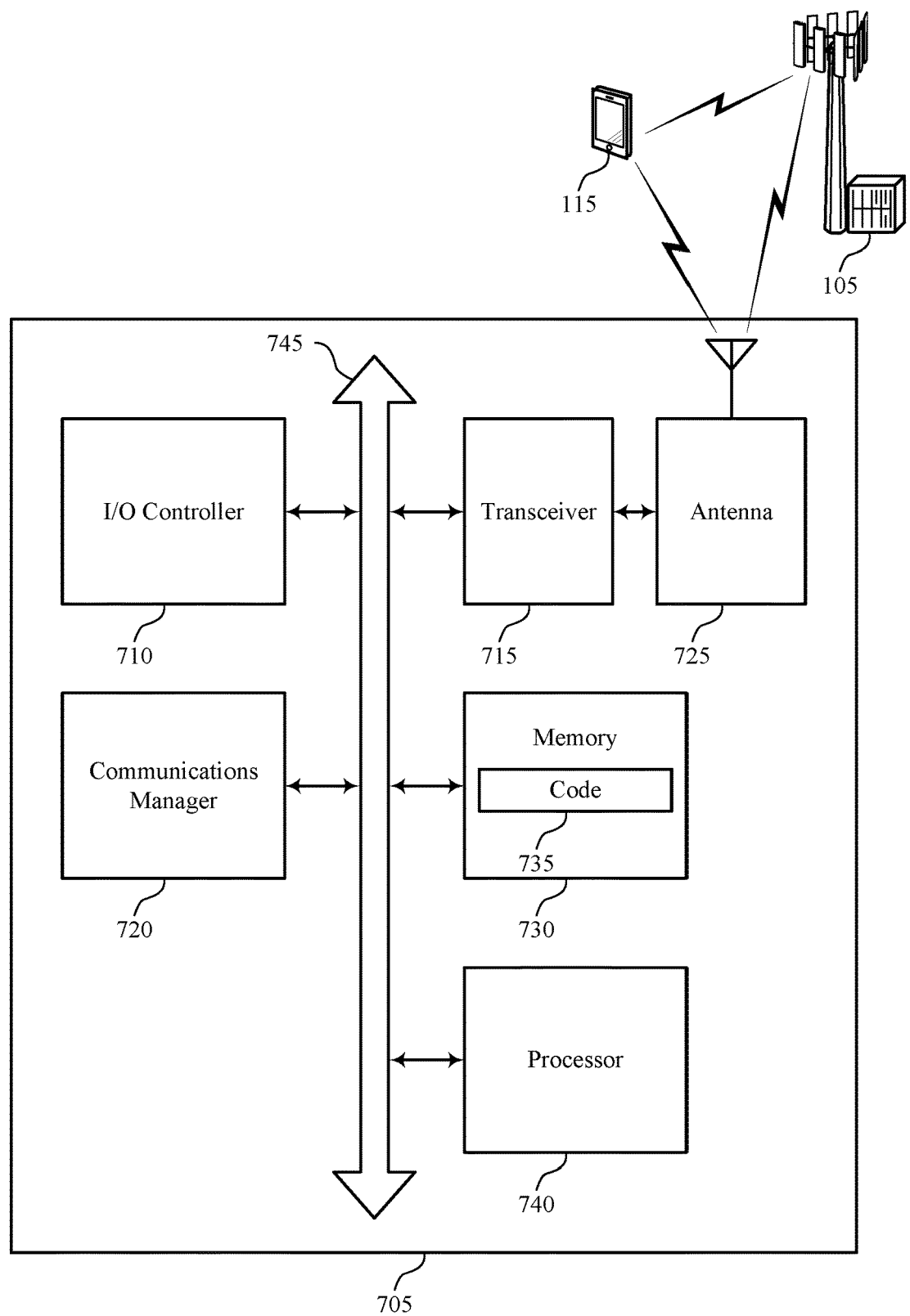
FIG. 7 shows a diagram of a system including a device that supports fast retransmission during handover in accordance with aspects of the present disclosure.

FIG. 7 shows a diagram of a system 700 including a device 705 that supports fast retransmission during handover in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting fast retransmission during handover). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, over a first connection with a radio access network, a request to establish a call using the first connection, the first connection using a first radio access technology. The communications manager 720 may be configured as or otherwise support a means for receiving, over the first connection as part of a procedure to establish the call, a command to handover communications from the first connection to a second connection with the radio access network, the second connection using a second radio access technology. The communications manager 720 may be configured as or otherwise support a means for establishing the second connection with the radio access network at least in part in response to receiving the command. The communications manager 720 may be configured as or otherwise support a means for transmitting, using the second connection after establishing the second connection, a first message indicating that the request was successfully received by the UE. The communications manager 720 may be configured as or otherwise support a means for transmitting, using the second connection after transmitting the first message, a second message indicating that an alert of the call is being issued at the UE.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of fast retransmission during handover as described herein, or the processor 740 and the memory 730 may be otherwise configured to perform or support such operations.

Figure 8:
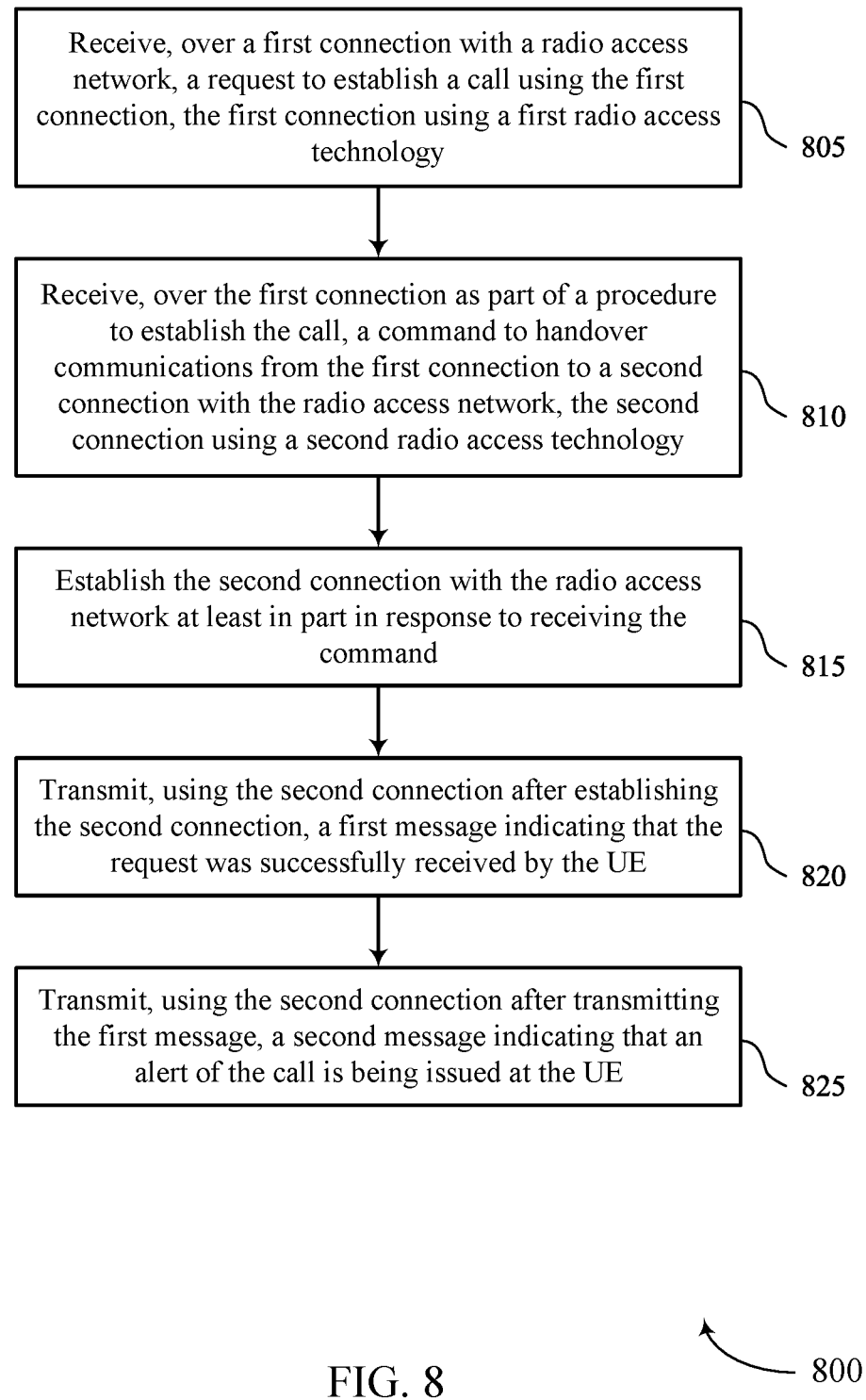
FIG. 8 shows a flowchart illustrating methods that support fast retransmission during handover in accordance with aspects of the present disclosure.

FIG. 8 shows a flowchart illustrating a method 800 that supports fast retransmission during handover in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving, over a first connection with a radio access network, a request to establish a call using the first connection, the first connection using a first radio access technology. The operations of 805 may be performed in accordance with examples as disclosed herein. In some examples, aspects of the operations of 805 may be performed by a call establishment component 625 as described with reference to FIG. 6.

At 810, the method may include receiving, over the first connection as part of a procedure to establish the call, a command to handover communications from the first connection to a second connection with the radio access network, the second connection using a second radio access technology. The operations of 810 may be performed in accordance with examples as disclosed herein. In some examples, aspects of the operations of 810 may be performed by a handover component 630 as described with reference to FIG. 6.

At 815, the method may include establishing the second connection with the radio access network at least in part in response to receiving the command. The operations of 815 may be performed in accordance with examples as disclosed herein. In some examples, aspects of the operations of 815 may be performed by a bearer establishment component 635 as described with reference to FIG. 6.

At 820, the method may include transmitting, using the second connection after establishing the second connection, a first message indicating that the request was successfully received by the UE. The operations of 820 may be performed in accordance with examples as disclosed herein. In some examples, aspects of the operations of 820 may be performed by a call establishment component 625 as described with reference to FIG. 6.

At 825, the method may include transmitting, using the second connection after transmitting the first message, a second message indicating that an alert of the call is being issued at the UE. The operations of 825 may be performed in accordance with examples as disclosed herein. In some examples, aspects of the operations of 825 may be performed by a call establishment component 625 as described with reference to FIG. 6.

The following provides an overview of aspects of the present disclosure:

Aspect 1: A method for wireless communication at a UE, comprising: receiving, over a first connection with a radio access network, a request to establish a call using the first connection, the first connection using a first radio access technology; receiving, over the first connection as part of a procedure to establish the call, a command to handover communications from the first connection to a second connection with the radio access network, the second connection using a second radio access technology; establishing the second connection with the radio access network at least in part in response to receiving the command; transmitting, using the second connection after establishing the second connection, a first message indicating that the request was successfully received by the UE; and transmitting, using the second connection after transmitting the first message, a second message indicating that an alert of the call is being issued at the UE.

Aspect 2: The method of aspect 1, further comprising: transmitting the first message using the first connection prior to transmitting the first message using the second connection, wherein the first message is transmitted using the second connection based at least in part on the first message being unacknowledged by the radio access network.

Aspect 3: The method of aspect 2, further comprising: starting a timer associated with discarding the first message based at least in part on transmitting the first message using the first connection; and disabling the timer based at least in part on receiving the command.

Aspect 4: The method of any of aspects 1 through 3, further comprising: buffering the first message based at least in part on receiving the command.

Aspect 5: The method of any of aspects 1 through 4, further comprising: buffering a plurality of messages associated with communicating with the radio access network via the first connection based at least in part on receiving the command, the plurality of messages comprising the first message.

Aspect 6: The method of aspect 5, further comprising: identifying a third message associated with communicating with the radio access network via the first connection as having a priority that exceeds a threshold; determining that the third message was discarded before an acknowledgement was received from the radio access network for the third message, wherein buffering the plurality of messages comprises buffering the third message based at least in part on determining that the third message was discarded.

Aspect 7: The method of aspect 6, further comprising: transmitting the third message using the second connection based at least in part on buffering the third message.

Aspect 8: The method of any of aspects 1 through 7, further comprising: identifying, after establishing the second connection, a third message associated with communicating with the radio access network via the second connection as having a priority that exceeds a threshold; determining that the third message was discarded before an acknowledgement was received from the radio access network for the third message; buffering the third message based at least in part on the message being discarded; and retransmitting the third message before transmitting other messages in a radio link control buffer.

Aspect 9: The method of any of aspects 1 through 8, wherein establishing the second connection comprises: establishing a radio bearer for the second radio access technology.

Aspect 10: The method of any of aspects 1 through 9, wherein the request is an INVITE message, the command is a mobilityfromNRCommand, the first message is a 200 OK message, and the second message is a 180 Ringing message.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, over a first connection with a radio access network, a request to establish a call using the first connection, the first connection using a first radio access technology;
   receiving, over the first connection as part of a procedure to establish the call, a command to handover communications from the first connection to a second connection with the radio access network, the second connection using a second radio access technology;
   establishing the second connection with the radio access network at least in part in response to receiving the command;
   transmitting, using the second connection after establishing the second connection, a first message indicating that the request was successfully received by the UE; and
   transmitting, using the second connection after transmitting the first message, a second message indicating that an alert of the call is being issued at the UE.

2. The method of claim 1, further comprising:
   transmitting the first message using the first connection prior to transmitting the first message using the second connection, wherein the first message is transmitted using the second connection based at least in part on the first message being unacknowledged by the radio access network.

3. The method of claim 2, further comprising:
   starting a timer associated with discarding the first message based at least in part on transmitting the first message using the first connection; and
   disabling the timer based at least in part on receiving the command.

4. The method of claim 1, further comprising:
   buffering the first message based at least in part on receiving the command.

5. The method of claim 1, further comprising:
   buffering a plurality of messages associated with communicating with the radio access network via the first connection based at least in part on receiving the command, the plurality of messages comprising the first message.

6. The method of claim 5, further comprising:
   identifying a third message associated with communicating with the radio access network via the first connection as having a priority that exceeds a threshold; and
   determining that the third message was discarded before an acknowledgement was received from the radio access network for the third message, wherein buffering the plurality of messages comprises buffering the third message based at least in part on determining that the third message was discarded.

7. The method of claim 6, further comprising:
   transmitting the third message using the second connection based at least in part on buffering the third message.

8. The method of claim 1, further comprising:
   identifying, after establishing the second connection, a third message associated with communicating with the radio access network via the second connection as having a priority that exceeds a threshold;
   determining that the third message was discarded before an acknowledgement was received from the radio access network for the third message;
   buffering the third message based at least in part on the third message being discarded; and
   retransmitting the third message before transmitting other messages in a radio link control buffer.

9. The method of claim 1, wherein establishing the second connection comprises:
   establishing a radio bearer for the second radio access technology.

10. The method of claim 1, wherein the request is an INVITE message, the command is a mobilityfromNRCommand, the first message is a 200 OK message, and the second message is a 180 Ringing message.

11. An apparatus for wireless communication at a user equipment (UE), comprising:
    a processor;
    memory coupled with the processor; and
    instructions stored in the memory and executable by the processor to cause the apparatus to:
       receive, over a first connection with a radio access network, a request to establish a call using the first connection, the first connection using a first radio access technology;
       receive, over the first connection as part of a procedure to establish the call, a command to handover communications from the first connection to a second connection with the radio access network, the second connection using a second radio access technology;
       establish the second connection with the radio access network at least in part in response to receiving the command;
       transmit, using the second connection after establishing the second connection, a first message indicating that the request was successfully received by the UE; and
       transmit, using the second connection after transmitting the first message, a second message indicating that an alert of the call is being issued at the UE.

12. The apparatus of claim 11, wherein the instructions are further executable by the processor to cause the apparatus to:
    transmit the first message using the first connection prior to transmitting the first message using the second connection, wherein the first message is transmitted using the second connection based at least in part on the first message being unacknowledged by the radio access network.

13. The apparatus of claim 12, wherein the instructions are further executable by the processor to cause the apparatus to:
    start a timer associated with discarding the first message based at least in part on transmitting the first message using the first connection; and disable the timer based at least in part on receiving the command.

14. The apparatus of claim 11, wherein the instructions are further executable by the processor to cause the apparatus to:
buffer the first message based at least in part on receiving the command.

15. The apparatus of claim 11, wherein the instructions are further executable by the processor to cause the apparatus to:
buffer a plurality of messages associated with communicating with the radio access network via the first connection based at least in part on receiving the command, the plurality of messages comprising the first message.

16. The apparatus of claim 15, wherein the instructions are further executable by the processor to cause the apparatus to:
identify a third message associated with communicating with the radio access network via the first connection as having a priority that exceeds a threshold; and
determine that the third message was discarded before an acknowledgement was received from the radio access network for the third message, wherein buffering the plurality of messages comprises buffering the third message based at least in part on determining that the third message was discarded.

17. The apparatus of claim 16, wherein the instructions are further executable by the processor to cause the apparatus to:
transmit the third message using the second connection based at least in part on buffering the third message.

18. The apparatus of claim 11, wherein the instructions to establish the second connection are executable by the processor to cause the apparatus to:
establish a radio bearer for the second radio access technology.

19. The apparatus of claim 11, wherein the request is an INVITE message, the command is a mobilityfromNRCommand, the first message is a 200 OK message, and the second message is a 180 Ringing message.

20. An apparatus for wireless communication at a user equipment (UE), comprising:
means for receiving, over a first connection with a radio access network, a request to establish a call using the first connection, the first connection using a first radio access technology;
means for receiving, over the first connection as part of a procedure to establish the call, a command to handover communications from the first connection to a second connection with the radio access network, the second connection using a second radio access technology;
means for establishing the second connection with the radio access network at least in part in response to receiving the command;
means for transmitting, using the second connection after establishing the second connection, a first message indicating that the request was successfully received by the UE; and
means for transmitting, using the second connection after transmitting the first message, a second message indicating that an alert of the call is being issued at the UE.

21. The apparatus of claim 20, further comprising:
means for transmitting the first message using the first connection prior to transmitting the first message using the second connection, wherein the first message is transmitted using the second connection based at least in part on the first message being unacknowledged by the radio access network.

22. The apparatus of claim 21, further comprising:
means for starting a timer associated with discarding the first message based at least in part on transmitting the first message using the first connection; and
means for disabling the timer based at least in part on receiving the command.

23. The apparatus of claim 20, further comprising:
means for buffering the first message based at least in part on receiving the command.

24. The apparatus of claim 20, further comprising:
means for buffering a plurality of messages associated with communicating with the radio access network via the first connection based at least in part on receiving the command, the plurality of messages comprising the first message.

25. The apparatus of claim 24, further comprising:
means for identifying a third message associated with communicating with the radio access network via the first connection as having a priority that exceeds a threshold; and
means for determining that the third message was discarded before an acknowledgement was received from the radio access network for the third message, wherein buffering the plurality of messages comprises buffering the third message based at least in part on determining that the third message was discarded.

26. The apparatus of claim 25, further comprising:
means for transmitting the third message using the second connection based at least in part on buffering the third message.

27. The apparatus of claim 20, wherein the means for establishing the second connection comprise:
means for establishing a radio bearer for the second radio access technology.

28. The apparatus of claim 20, wherein the request is an INVITE message, the command is a mobilityfromNRCommand, the first message is a 200 OK message, and the second message is a 180 Ringing message.

29. A non-transitory computer-readable medium storing code for wireless communication at a user equipment (UE), the code comprising instructions executable by a processor to:
receive, over a first connection with a radio access network, a request to establish a call using the first connection, the first connection using a first radio access technology;
receive, over the first connection as part of a procedure to establish the call, a command to handover communications from the first connection to a second connection with the radio access network, the second connection using a second radio access technology;
establish the second connection with the radio access network at least in part in response to receiving the command;
transmit, using the second connection after establishing the second connection, a first message indicating that the request was successfully received by the UE; and
transmit, using the second connection after transmitting the first message, a second message indicating that an alert of the call is being issued at the UE.

30. The non-transitory computer-readable medium of claim 29, wherein the instructions are further executable by the processor to:
transmit the first message using the first connection prior to transmitting the first message using the second connection, wherein the first message is transmitted using the second connection based at least in part on the first message being unacknowledged by the radio access network.

\* \* \* \* \*